United States Patent
Ha et al.

(10) Patent No.: US 11,476,710 B2
(45) Date of Patent: Oct. 18, 2022

(54) METHOD FOR CONTROLLING WIRELESS TRANSMISSION POWER AND ELECTRONIC DEVICE INCLUDING SAME

(71) Applicant: Samsung Electronics Co., Ltd., Gyeonggi-do (KR)

(72) Inventors: Mincheol Ha, Gyeonggi-do (KR); Kwangseob Kim, Gyeonggi-do (KR); Kihyun Kim, Gyeonggi-do (KR); Dongzo Kim, Gyeonggi-do (KR); Jihye Kim, Gyeonggi-do (KR); Yunjeong Noh, Gyeonggi-do (KR); Changhak O, Gyeonggi-do (KR); Kyungmin Lee, Gyeonggi-do (KR); Hyungkoo Chung, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 148 days.

(21) Appl. No.: 16/929,581

(22) Filed: Jul. 15, 2020

(65) Prior Publication Data

US 2021/0036550 A1 Feb. 4, 2021

(30) Foreign Application Priority Data

Jul. 31, 2019 (KR) ........................ 10-2019-0092954

(51) Int. Cl.
*H02J 50/60* (2016.01)
*H02J 50/10* (2016.01)
(Continued)

(52) U.S. Cl.
CPC ................ *H02J 50/10* (2016.02); *H02J 7/02* (2013.01); *H02J 50/60* (2016.02); *H02J 50/80* (2016.02)

(58) Field of Classification Search
CPC ....................................................... H02J 50/60
(Continued)

(56) References Cited

U.S. PATENT DOCUMENTS 10,498,176 B2 12/2019 Park
2012/0313579 A1 12/2012 Matsumoto et al.
(Continued)

FOREIGN PATENT DOCUMENTS

EP 3393009 A1 * 10/2018 .............. H02J 50/10
KR 10-2016-0061121 A 5/2016
(Continued)

OTHER PUBLICATIONS

International Search Report dated Nov. 3, 2020.

*Primary Examiner* — Edward Tso
*Assistant Examiner* — Ahmed H Omar
(74) *Attorney, Agent, or Firm* — Cha & Reiter, LLC

(57) ABSTRACT

An electronic device according to an embodiment may include: a wireless charging coil; a power transmission circuit configured to be electrically connected to the wireless charging coil; a wireless communication circuit configured to communicate with an external electronic device; and a control circuit. The control circuit may be configured to: transmit power to an external electronic device; obtain data corresponding to power received by the external electronic device in response to the transmitted power using the wireless communication circuit; obtain power loss based on the obtained data; stop transmitting the power to the external electronic device when the power loss exceeds a first threshold; and stop transmitting the power to the external electronic device according to whether an event related the power loss occurs even when the power loss is lower than the first threshold.

20 Claims, 8 Drawing Sheets

(51) Int. Cl.
  *H02J 50/80*    (2016.01)
  *H02J 7/02*     (2016.01)
(58) Field of Classification Search
  USPC .......................................................... 320/108
  See application file for complete search history.

(56) References Cited

U.S. PATENT DOCUMENTS

| | | | |
|---|---|---|---|
| 2015/0171633 A1* | 6/2015 | Nakano | B60L 53/36 |
| | | | 307/104 |
| 2016/0056661 A1* | 2/2016 | Tanaka | H02J 50/005 |
| | | | 320/108 |
| 2016/0294195 A1 | 10/2016 | Fei et al. | |
| 2017/0229926 A1 | 8/2017 | Oettinger et al. | |
| 2018/0294679 A1 | 10/2018 | Nakano et al. | |
| 2019/0131826 A1 | 5/2019 | Park et al. | |
| 2019/0267849 A1 | 8/2019 | Ha et al. | |

FOREIGN PATENT DOCUMENTS

| | | | |
|---|---|---|---|
| KR | 10-2017-0118571 A | 10/2017 | |
| KR | 10-2018-0002206 A | 1/2018 | |
| KR | 10-2019-0101656 A | 9/2019 | |
| WO | 2014/010997 A1 | 1/2014 | |
| WO | WO-2018194409 A1 * | 10/2018 | ........... G01R 19/165 |

* cited by examiner

METHOD FOR CONTROLLING WIRELESS TRANSMISSION POWER AND ELECTRONIC DEVICE INCLUDING SAME

CROSS-REFERENCE TO RELATED APPLICATION(S)

This application is based on and claims priority under 35 U.S.C. 119 to Korean Patent Application No. 10-2019-0092954, filed on Jul. 31, 2019, in the Korean Intellectual Property Office, the disclosure of which is herein incorporated by reference in its entirety.

BACKGROUND

1) Field

One or more embodiments generally relate to a method for controlling wireless transmission power by detecting a foreign object and an electronic device for performing the same.

2) Description of Related Art

Wireless charging technology is a technique using wireless power transmission and reception, which enables power to be wirelessly transferred from a power transmission device to a power reception device without any physical connection between the power reception device and the power transmission device via a charging connector. The power transferred may charge a battery of the power reception device.

The above information is presented as background information only to assist with an understanding of the disclosure. No determination has been made, and no assertion is made, as to whether any of the above might be applicable as prior art with regard to the disclosure.

SUMMARY

In wireless charging technology, a foreign object detection (FOD) function may be performed to detect whether there is a foreign object between the wireless power transmission device and the wireless power reception device, and to block power transmission from the wireless power transmission device when the foreign object is detected.

When the foreign object is a conductive material (e.g., metallic object or conductive material that is different from those in the power reception device), heat may be excessively generated in the wireless charging device even when the foreign object causes a certain amount of power loss, or heat may be generated due to energy induced in the foreign object.

An electronic device according to an embodiment may include: a housing; a wireless charging coil configured to be disposed in the housing; a power transmission circuit configured to be electrically connected to the wireless charging coil; a wireless communication circuit configured to communicate with an external electronic device; and a control circuit configured to be electrically connected to a power management circuit and the wireless communication circuit, wherein the control circuit may be configured to: transmit power to an external electronic device; obtain data corresponding to power received by the external electronic device in response to the transmitted power using the wireless communication circuit; obtain power loss based on the obtained data; stop transmitting the power to the external electronic device when the power loss exceeds a first threshold; and stop transmitting the power to the external electronic device according to whether an event related the power loss occurs even when the power loss is lower than the first threshold.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

According to certain embodiments, there may be provided a method and an electronic device for protecting the wireless power transmission device and the wireless power reception device by detecting that a conductive foreign object is interposed between the wireless power transmission device and the wireless power reception device while power is transmitted.

A power transmission device according to certain embodiments may, for user convenience, set a high threshold for power loss that may be used to detect a foreign object. An electronic device according to certain embodiments can detect a conductive foreign object even though power loss due to the conductive foreign object is lower than the threshold, thus improving user convenience and securing safety in wireless charging.

Figure 1:
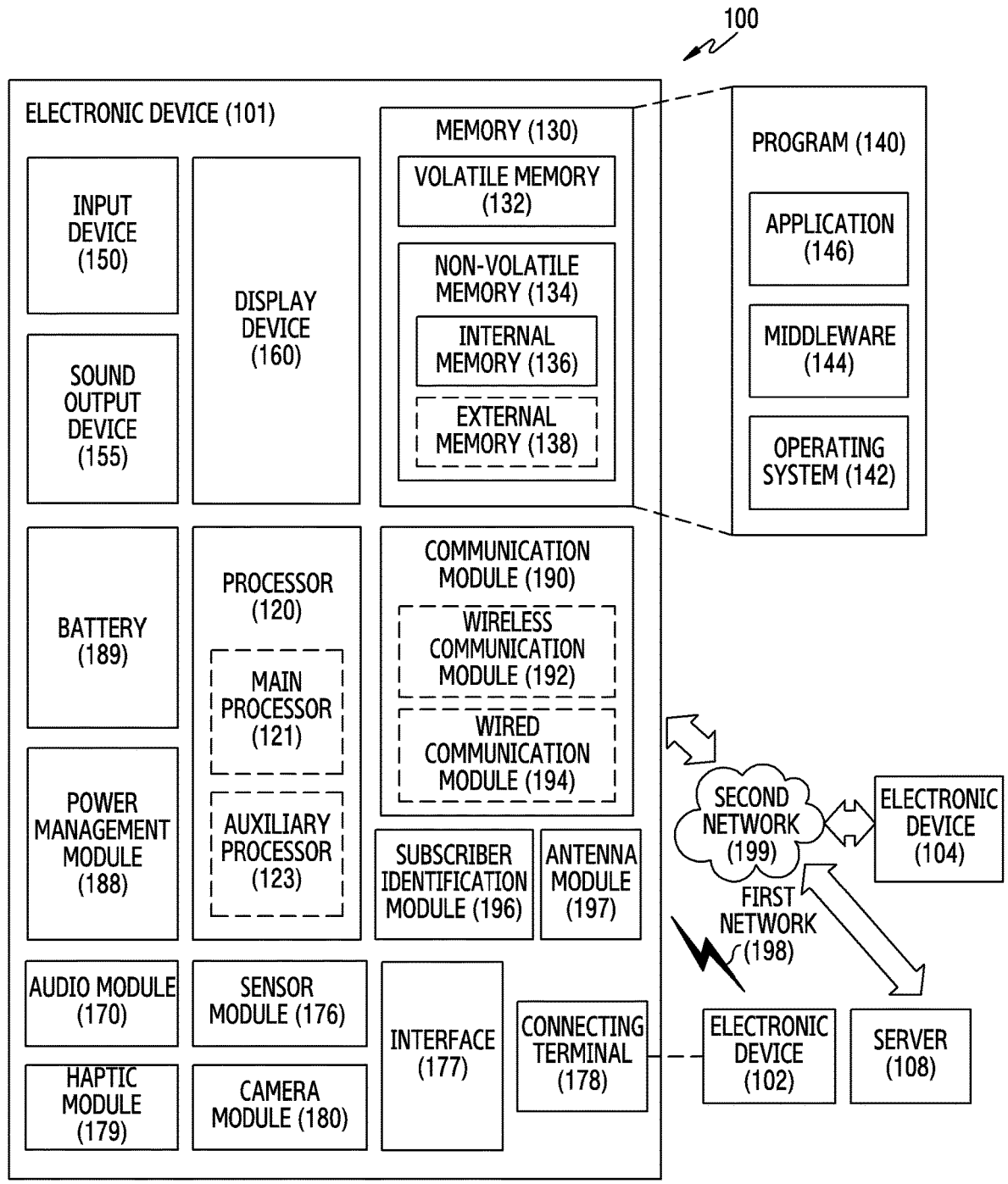
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
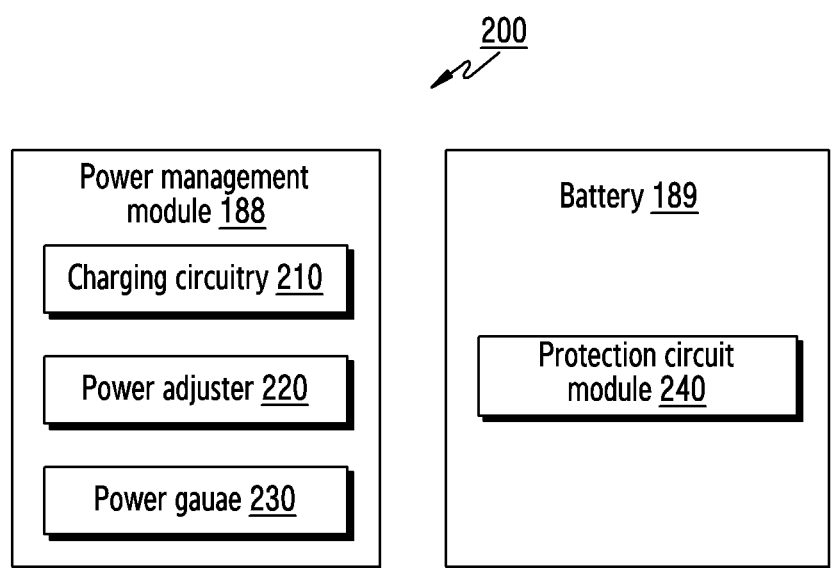
FIG. 2 is a block diagram illustrating a power management module and a battery according to an embodiment.

FIG. 2 is a block diagram 200 illustrating the power management module 188 and the battery 189 according to an embodiment. Referring to FIG. 2, the power management module 188 may include charging circuitry 210, a power adjuster 220, or a power gauge 230. The charging circuitry 210 may charge the battery 189 by using power supplied from an external power source that is outside the electronic device 101. According to an embodiment, the charging circuitry 210 may select a charging scheme (e.g., normal charging or quick charging) based at least in part on the type of the external power source (e.g., whether the power source is a power outlet, connected via USB, or a wireless charger), magnitude of power that can be supplied from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting the voltage level or the current level of the power supplied from the external power source or the battery 189. The power adjuster 220 may adjust the voltage level or the current level of the power supplied from the external power source or the battery 189 into a different voltage level or current level appropriate for one or more of the components included in the electronic device 101. According to an embodiment, the power adjuster 220 may be implemented in the form of a low drop out (LDO) regulator or a switching regulator. The power gauge 230 may measure use state information about the battery 189 (e.g., capacity, the number of times of charging or discharging, voltage, or temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., temperature sensor) of the sensor module 176, the power gauge 230, or the power management module 188. According to an embodiment, the corresponding sensor (e.g., temperature sensor) of the sensor module 176 may be included as part of the PCM 240, or may be disposed near the battery 189 as a separate device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
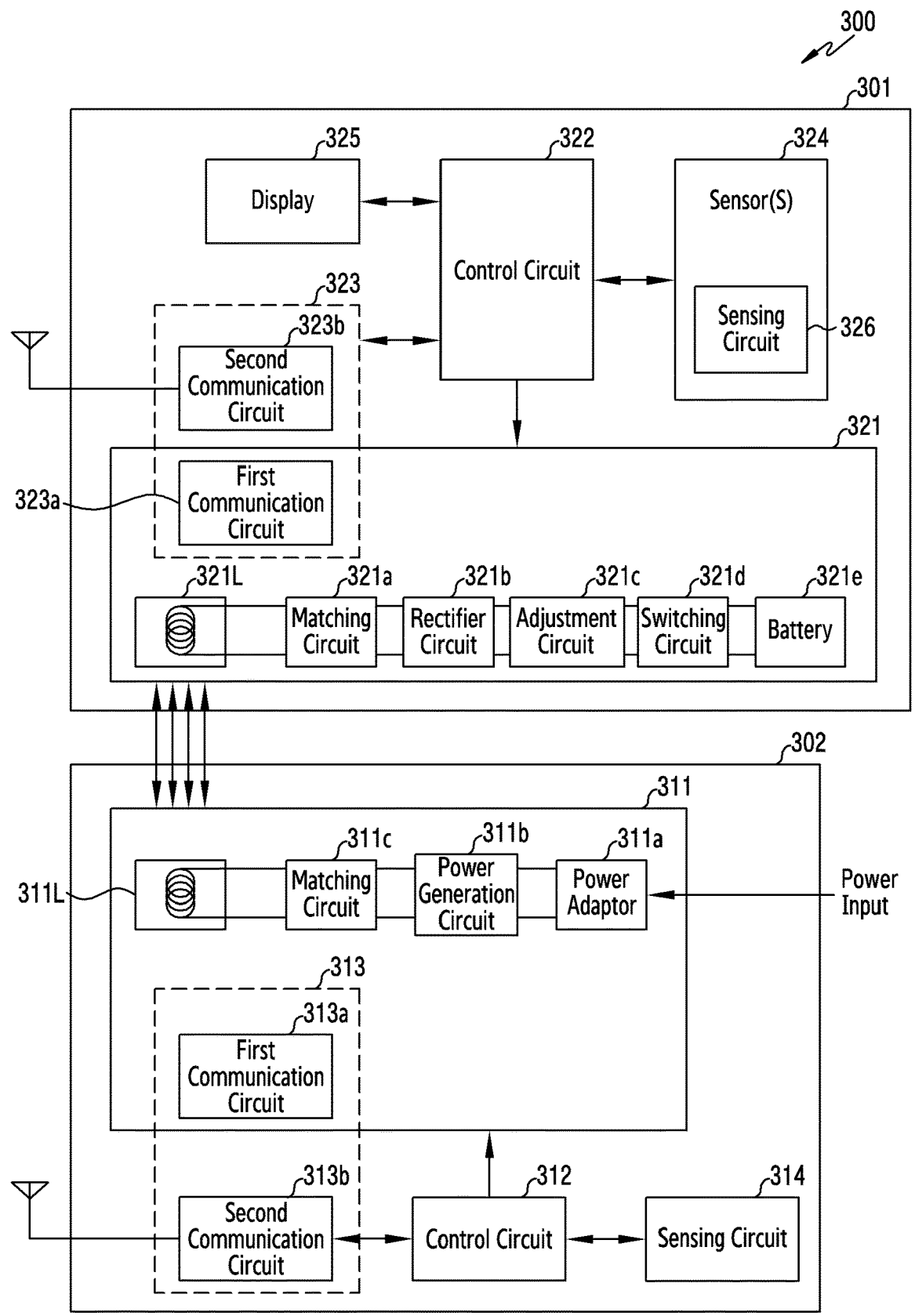
FIG. 3 illustrates a wireless charging system according to an embodiment.

FIG. 3 illustrates a wireless charging system 300 according to an embodiment.

Referring to FIG. 3, an electronic device 302 (e.g., the electronic device 102 of FIG. 1) according to an embodiment may wireless supply power to an external electronic device 301 (e.g., the electronic device 101 of FIG. 1). The electronic device 302 may be a wireless power transmitter or an electronic device operating in a power transmission mode. According to an embodiment, the electronic device 302 may be configured the same as or similar to the electronic device 102 illustrated in FIG. 1. Alternatively, the external electronic device 301 may be configured the same as or similar to the electronic device 101 illustrated in FIG. 1.

According to an embodiment, the electronic device 302 may be a power transmission device capable of transmitting power to the external electronic device 301, and the external electronic device 301 may be a power reception device capable of receiving power from the electronic device 302.

According to an embodiment, the electronic device 302 may include a power transmission circuit 311, a control circuit 312, a communication circuit 313, or a sensing circuit 314.

According to an embodiment, the power transmission circuit 311 may include a power adapter 311a to receive power or electricity supplied externally and to appropriately convert the voltage of input power. The power transmission circuit 311 may further include a power generation circuit 311b to generate power, and/or a matching circuit 311c to maximize efficiency between a transmission coil 311L and a reception coil 321L.

According to an embodiment, the power transmission circuit 311 may communicate with a first communication circuit 323a of the external electronic device 301 using a frequency the same as or adjacent to that used for by the transmission coil 311L for power transmission. The power transmission circuit 311 may perform operations corresponding to the operation of the first communication circuit 313a described below.

According to an embodiment, the power transmission circuit 311 may include a first communication circuit 313a, which will be described later, and may communicate with the first communication circuit 323a of the external electronic device 301 through the first communication circuit 313a.

According to an embodiment, the electronic device 302 may include a separate communication circuit to communicate with the external electronic device 301 using any one of various short-range communication methods, such as Bluetooth, Bluetooth Low Energy (BLE), Wi-Fi, and near-field communication (NFC). The separate communication circuit may correspond to, for example, a second communication circuit 313b, which will be described later.

According to an embodiment, the power transmission circuit 311 may include multiples of components such as the power adapter 311a, the power generation circuit 311b, the transmission coil 311L, or the matching circuit 311c to enable power transmission to a plurality of power reception devices (e.g., first external electronic device and second external electronic device).

According to an embodiment, the control circuit 312 may control the electronic device 302 overall and may generate and transmit various messages necessary for wireless power transmission to the communication circuit 313. In one embodiment, the control circuit 312 may calculate power (or a power value) to be transmitted to the external electronic device 301 based on information received from the communication circuit 313. In one embodiment, the control circuit 312 may control the power transmission circuit 311 to transmit power generated by the transmission coil 311L to the external electronic device 301. The control circuit 312 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "control circuit," "processor," or "microprocessor" may be hardware in the claimed disclosure. Under the broadest reasonable interpretation, the appended claims are statutory subject matter in compliance with 35 U.S.C. § 101.

According to an embodiment, the communication circuit 313 may include the first communication circuit 313a and/or the second communication circuit 313b. The first communication circuit 313a may communicate with the first communication circuit 323a of the external electronic device 301, for example, using a frequency that is the same as or adjacent to the frequency used by the transmission coil 311L for power transmission.

The first communication circuit 313a may communicate with the first communication circuit 323a using the transmission coil 311L. Data (or a communication signal) generated by the first communication circuit 313a may be transmitted using the transmission coil 311L. The first communication circuit 313a may transmit the data to the external electronic device 301 using frequency-shift keying (FSK). According to an embodiment, the first communication circuit 313a may communicate with the first communication circuit 323a of the external electronic device 301 by changing the frequency of the power signal transmitted through the transmission coil 311L. This way, the first communication circuit 313a may communicate with the first communication circuit 323a of the external electronic device 301 by including data in the power signal generated by the power generation circuit 311b. For example, the first communication circuit 313a may express data by modulating the frequency of the power transmission signal.

The second communication circuit 313b may communicate with a second communication circuit 323b of the external electronic device 301, for example, using a frequency different from the frequency used by the transmission coil 311L for power transmission. This may be referred to as an out-band communication method. For example, the second communication circuit 313b may obtain information about the charging state of the battery (e.g., voltage value after being rectified, rectified voltage value (e.g., Vrec) information, information about current (e.g., Iout) flowing through a coil or a rectifier circuit, various packets, messages, and the like) from the second communication circuit 323b using any one of various short-range communication methods, such as Bluetooth, Bluetooth Low Energy (BLE), Wi-Fi, and near-field communication (NFC).

According to an embodiment, the sensing circuit 314 may include at least one sensor and may detect at least one state of the power transmission device 301 using the at least one sensor.

According to an embodiment, the sensing circuit 314 may include at a temperature sensor, a motion sensor, and/or a current (or voltage) sensor, may detect the temperature state of the electronic device 302 using the temperature sensor, may detect the movement state of the electronic device 302 using the motion sensor, and may detect the state of an output power signal of the electronic device 302, for example, current level, voltage level, or power level, using the current (or voltage) sensor.

According to one embodiment, the current (or voltage) sensor may measure a signal in the power transmission circuit 311. The current (or voltage) sensor may measure a signal in at least a portion of the matching circuit 311c or the power generation circuit 311b. For example, the current (or voltage) sensor may include a circuit to measure a signal at the front end of the coil 311L.

According to an embodiment, the sensing circuit 314 may include a circuit for foreign object detection (FOD). The electronic device 302 may measure the current and the voltage in the power transmission circuit 311 using the sensing circuit 314 and may obtain the level of power transmitted by the electronic device 302 based on the measured current and voltage. When there is a foreign object between the electronic device 302 and the external electronic device 301, the level of power loss, which is the difference between power transmitted by the electronic device 302 and power received by the external electronic device 301, may increase. When the power loss exceeds a specified threshold, the electronic device 302 may stop power transmission.

According to an embodiment, the external electronic device 301 (e.g., the electronic device 101 of FIG. 1) may include a power reception circuit 321 (e.g., the power management module 188 of FIG. 1), a control circuit 322 (e.g., the processor 120 in FIG. 1), a communication circuit 323 (e.g., the communication module 190 of FIG. 1), at least one sensor 324 (e.g., the sensor module 176 of FIG. 1), a display 325 (e.g., the display device 160 of FIG. 1), or a sensing circuit 326. A description of components of the external electronic device 301 corresponding to those of the electronic device 302 may be partially omitted.

According to an embodiment, the power reception circuit 321 may include the reception coil 321L to wirelessly receive power from the electronic device 302, a matching circuit 321a, and a rectifier circuit 321b to rectify received AC power into DC, an adjustment circuit 321c to adjust the charging voltage, a switch circuit 321d, and/or a battery 321e (e.g., the battery 189).

According to an embodiment, the control circuit 322 may control the external electronic device 301 overall and may generate and transmit various messages necessary for wireless power transmission to the communication circuit 323.

According to an embodiment, the communication circuit 323 may include at least one of the first communication circuit 323a or the second communication circuit 323b. The first communication circuit 323a may communicate with the electronic device 302 through the reception coil 321L.

The first communication circuit 323a may communicate with the first communication circuit 313a using the reception coil 321L. Data (or a communication signal) generated by the first communication circuit 323a may be transmitted using the reception coil 321L. The first communication circuit 323a may transmit the data to the electronic device 302 using amplitude-shift keying (ASK). The second communication circuit 323b may communicate with the electronic device 302 using any one of various short-range communication methods, such as Bluetooth, BLE, Wi-Fi, and NFC.

According to an embodiment, the at least one sensor 324 may include various sensors such as current/voltage sensor, temperature sensor, illuminance sensor, or acceleration sensor.

According to an embodiment, the display 325 may display various types of display information necessary for wireless power transmission and reception.

According to an embodiment, the sensing circuit 326 may detect the electronic device 302 by detecting a search signal or received power from the electronic device 302. The sensing circuit 326 may detect a change of the signal of the coil 321L, the matching circuit 321a, or an input/output terminal of the rectifier circuit 321b when these signals are changed by a signal output from the electronic device 302. According to an embodiment, the sensing circuit 326 may be included in the reception circuit 321.

Figure 4A:
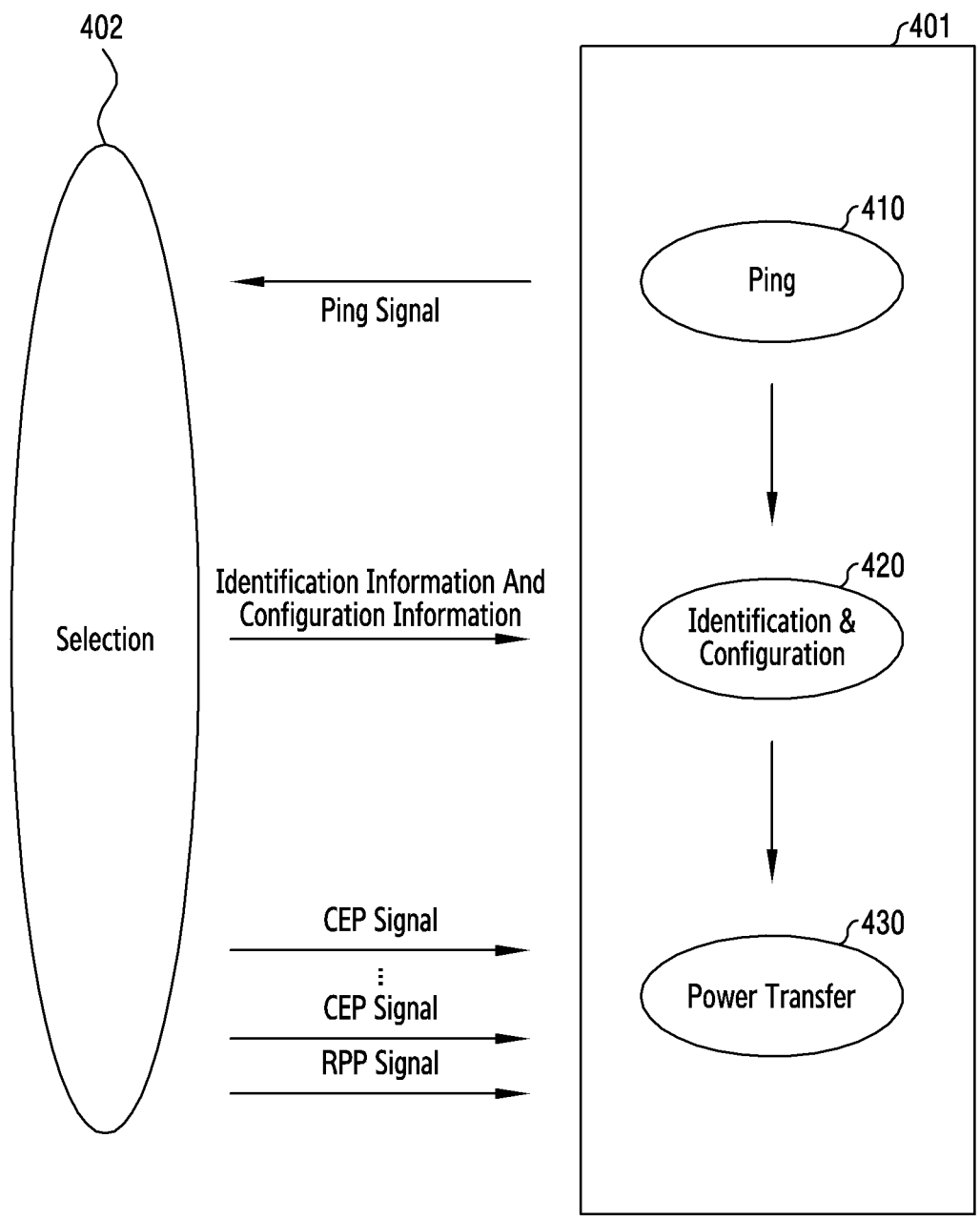
FIG. 4A illustrates an operation mode of a power transmission device in wireless charging according to an embodiment.
Figure 4B:
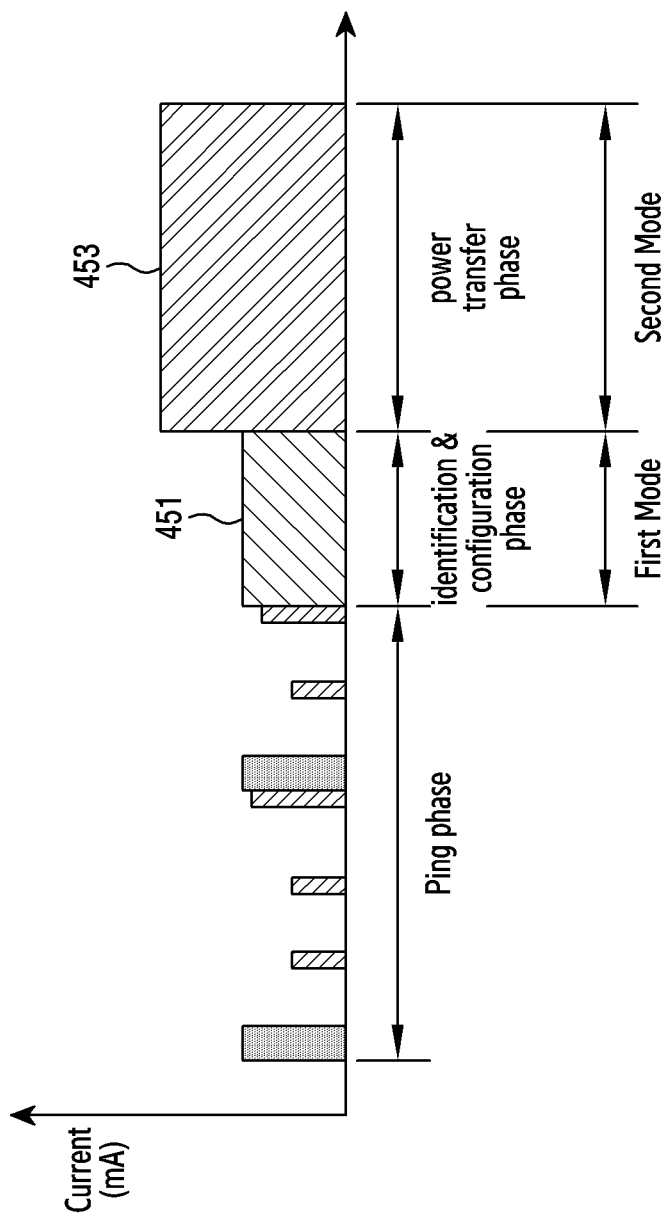
FIG. 4B illustrates an operation mode of a power transmission device in wireless charging according to an embodiment.

FIG. 4A illustrates an operation mode of a power transmission device in wireless charging according to an embodiment, and FIG. 4B illustrates an operation mode of a power transmission device in wireless charging according to an embodiment.

Referring to FIG. 4A, in one embodiment, an electronic device 401 (e.g., the electronic device 102 of FIG. 1 or the electronic device 302 of FIG. 3) may detect and authenticate an external electronic device 402 (e.g., the electronic device 101 of FIG. 2 or the external electronic device 301 of FIG. 3) and may transmit and receive at least one signal corresponding to a ping phase 410, an identification and configuration phase 420, and/or a power transfer phase 430 in order to provide power to the external electronic device 402.

The electronic device 401 may transmit a ping signal, for example, a digital ping signal or an analog ping signal, in the ping phase 410. The electronic device 401 may detect the external electronic device 402 as the external electronic device 402 receives the ping signal from the electronic device 401.

The electronic device 401 may receive identification information and configuration information for authenticating the power reception device from the external electronic device 402 in the authentication and configuration phase 420 after the external electronic device 402 is detected. The identification information may include information for identifying the external electronic device 402, and the configuration information may include various types of information necessary for the external electronic device 402 to receive power.

The electronic device 401 may authenticate the external electronic device 402 based on the identification information and the configuration information from the external electronic device 402, and may receive at least one control error packet (CEP) signal from the external electronic device 402 in the power transfer phase 430 upon succeeding in authentication, and may receive at least one received power packet (RPP) signal from the external electronic device 402. The control error packet (CEP) signal may include information indicating the level of transmission power transmitted from the electronic device 401, and the received power packet (RPP) signal may include information indicating the level of reception power received by the external electronic device 402. The electronic device 401 may adjust power output to the external electronic device 402 based on the CEP signal and the RPP signal.

Referring to FIG. 4B, in one embodiment, the electronic device 401 may wirelessly output specified power (or specified current or voltage) through a transmission coil (e.g., the transmission coil 311L of FIG. 3) when outputting at least one signal corresponding to at least one phase of the ping phase 410, the identification and configuration phase 420, and/or the power transfer phase 430.

According to an embodiment, the electronic device 401 may output first specified power using a first charging current 451 in a first mode during the identification and configuration phase 420 for performing authentication of the external electronic device 402 and may output second specified power using a second charging current 453 in a second mode during the power transfer phase 430.

According to an embodiment, the electronic device 401 may detect whether there is a foreign object between the electronic device 401 and the external electronic device 402 according to the energy detected in the transmission coil (e.g., the transmission coil 311L of FIG. 3) when transceiving the first specified power, and may output the second specified power to the power reception device 402 or may stop outputting power to the external electronic device 402 depending on whether the foreign object is detected.

Figure 5:
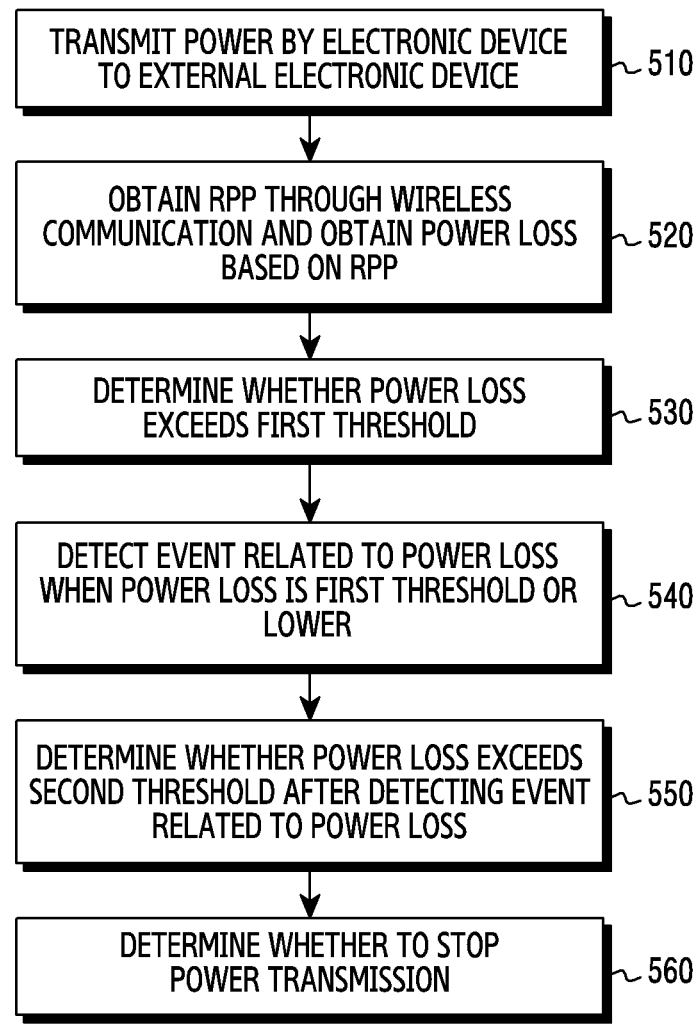
FIG. 5 is a flowchart illustrating a power transmission control operation of an electronic device corresponding to detection of a foreign object during power transmission to an external electronic device according to an embodiment.
Figure 6:
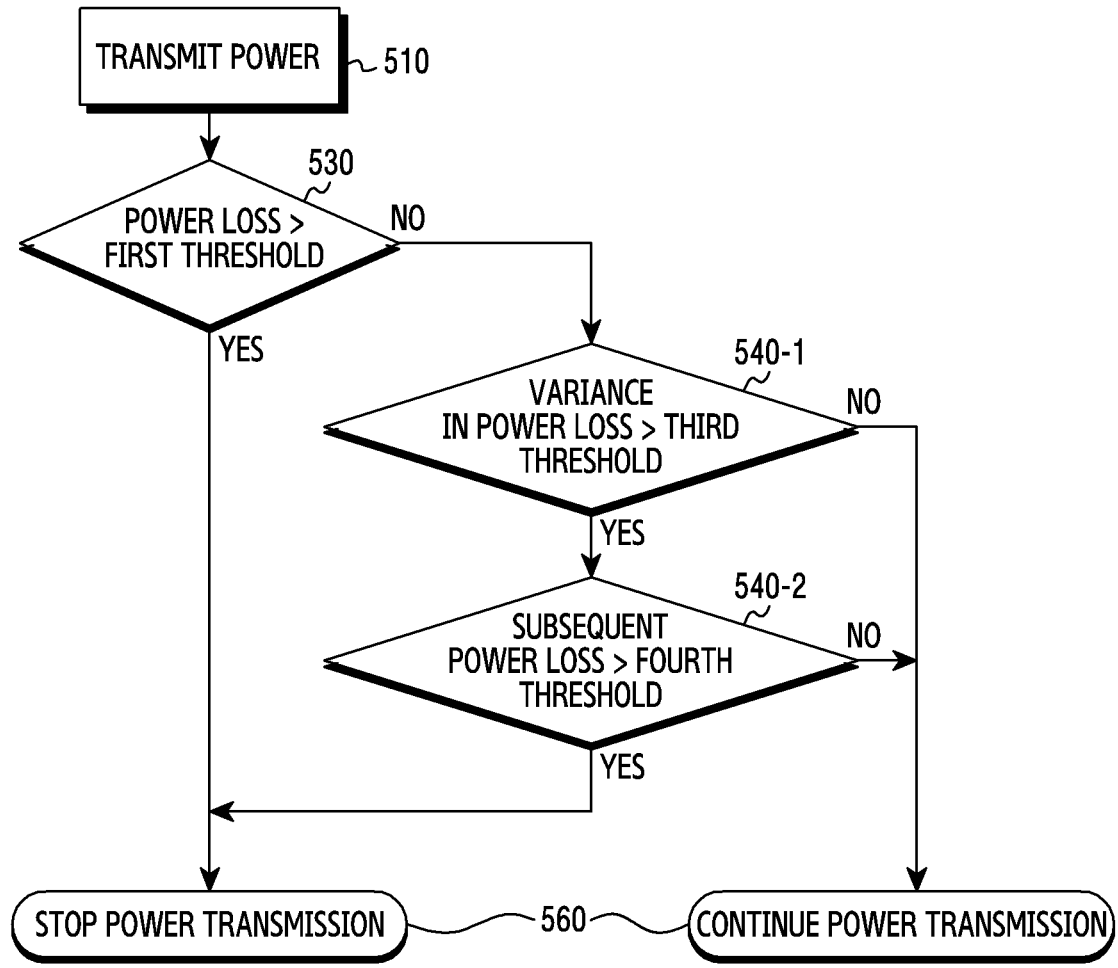
FIG. 6 is a flowchart illustrating a power transmission control operation of an electronic device corresponding to detection of a foreign object during power transmission according to an embodiment.

FIG. 5 is a flowchart illustrating a power transmission control operation of an electronic device (e.g., the electronic device 302 of FIG. 3) corresponding to detection of a foreign object during power transmission to an external electronic device (e.g., the external electronic device 301 of FIG. 3) according to an embodiment. FIG. 6 is a flowchart illustrating a power transmission control operation of an electronic device corresponding to detection of a foreign object during power transmission according to an embodiment. Hereinafter, the power transmission control operation of the electronic device will be described with reference to FIG. 5 and FIG. 6. The operation of the electronic device described below may be performed by a control circuit (e.g., the control circuit 312 of FIG. 3) of the electronic device.

According to an embodiment, in operation 510, in which the electronic device transmits power to the external electronic device, when a foreign object is interposed between the electronic device and the external electronic device, power received by the external electronic device may be reduced, and thus power loss obtained in operation 520 may increase. Accordingly, the electronic device may detect the foreign object disposed between the electronic device and the external electronic device based on the power loss, and may stop transmitting the power.

According to an embodiment, in operation 520, the power loss may be calculated based on the power transmitted by the electronic device and the power received by the external electronic device. For example, the power loss may correspond to the difference between the transmitted power and the received power. The electronic device may periodically obtain the power received by the external electronic device from the external electronic device through a wireless communication circuit (e.g., the second communication circuit 313b of FIG. 3). Specifically, the electronic device may periodically obtain a received power packet (RPP), which is data including the value of power received by the external electronic device, from the external electronic device. The electronic device may identify not only the power loss from the transmission power and the RPP but also a variation in the power loss. For example, the electronic device may obtain a variance in the power loss based on the difference between first power loss at a first time point and second power loss at a second time point after a lapse of a specified time from the first time point.

In operation 530, the electronic device may determine whether the power loss exceeds a first threshold in order to detect the foreign object interposed between the electronic device and the external electronic device. When the power loss exceeds the first threshold, the electronic device may determine that there is a foreign object between the electronic device and the external electronic device, and when the power loss does not exceed the first threshold, the electronic device may determine that there is no foreign object between the electronic device and the external electronic device.

In operation 560, when a foreign object between the electronic device and the external electronic device is detected, the electronic device may determine whether to stop power transmission accordingly. Hereinafter, existence (or nonexistence) of the foreign object may mean that the foreign object exists (or does not exist) between the electronic device and the external electronic device.

According to an embodiment, when the power loss exceeds the first threshold, the electronic device may determine that there is a foreign object between the electronic device and the external electronic device and may stop power transmission. However, when the power loss does not exceed the first threshold, the electronic device may continue to transmit power to the power reception device.

According to an embodiment, the electronic device stopping power transmission when the power loss exceeds the first threshold in operation 560 may be one example of a function executed when there is a foreign object between the electronic device and the external electronic device, and various other operations may be executed in addition to simply stopping the power transmission. For example, upon detecting a foreign object, the electronic device may display a notification corresponding to detection of the foreign object on a display of the external electronic device, instead of immediately stopping power transmission, thereby suggesting to the user that he or she should remove the foreign object. In another example, the electronic device may provide a notification corresponding to detection of the foreign object for the user through a light emitting unit or a sound output unit provided in the electronic device. Hereinafter, the operation of stopping power transmission in response to detection of a foreign object is illustrated as a representative example of operations performed in response to the detection of the foreign object for convenience of explanation and may be construed to include all of various operations in response to the detection of the foreign object.

When it is determined that the power loss does not exceed the first threshold and thus there is no foreign object while the electronic device is transmitting power in operation 530, the electronic device may continue to transmit power. However, even though the power loss does not exceed the first threshold, there still may be a foreign object between the electronic device and the external electronic device. That is, even though there is a foreign object between the electronic device and the external electronic device, the power loss due to the foreign object may not exceed the first threshold. However, when the foreign object includes a conductive member, if the electronic device does not stop power transmission, heat may be increasingly generated in the foreign object that includes the conductive member (hereinafter, referred to as "conductive foreign object"). Thus, when the electronic device continues to transmit power to the external electronic device, a serious problem may occur. Current induced in the conductive foreign object due to a magnetic field generated by the electronic device while the electronic device is transmitting power to the external electronic device may increase the temperature of the conductive foreign object. As a result, not only the electronic device but also the external electronic device may be heated and damaged by the foreign object. That is, when the electronic device does not stop power transmission only because the power loss does not exceed the first threshold despite existence of a conductive foreign object between the electronic device and the external electronic device, performance of the electronic device or the external electronic device may deteriorate or the electronic device or the external electronic device may be damaged.

According to an embodiment, even though it is determined that the power loss does not exceed the first threshold in operation 530, the electronic device may detect a foreign object through operation 540 and/or operation 550 and may stop (560) power transmission to the external electronic device.

According to an embodiment, in operation 540, the electronic device may determine that there is a conductive foreign object between the electronic device and the external electronic device based on a variation in power loss over time, even when the power loss does not exceed the first threshold. According to an embodiment, when the variation in power loss satisfies a preset criterion, the electronic device may determine that there is a conductive foreign object between the electronic device and the external electronic device.

According to an embodiment, since the variation in power loss due to misalignment between the electronic device and the external electronic device and a variation in power loss due to the existence of a conductive foreign object may be different, the electronic device may identify whether the increase in power loss is due to misalignment between the electronic device and the external electronic device or due to a conductive foreign object.

For example, when the position of the external electronic device with respect to the electronic device is changed while the electronic device is transmitting power to the external electronic device, power loss may significantly increase at the moment of the position change. However, the electronic device may adjust the power after detecting the power loss, thus reducing the level of power loss after the lapse of a certain time period. In contrast, when a conductive foreign object is interposed between the electronic device and the external electronic device while the electronic device is transmitting power to the external electronic device, power loss may significantly increase at the moment of the interposition. However, in the case where the conductive foreign object is interposed, the level of power loss may be maintained high even after the lapse of a certain time period. Therefore, according to an embodiment, the electronic device may monitor the change in power loss over time, thereby detecting whether a conductive foreign object is interposed between the electronic device and the external electronic device.

According to another embodiment, since the variation in power loss due to a nonconductive foreign object may be different from the variation in power loss due to a conductive foreign object, the electronic device may identify whether the increase in power loss is due to a conductive foreign object based on a variation in power loss. According to an embodiment, due to specific characteristics of a conductive member included in the conductive foreign object, the variation in power loss due to the conductive foreign object may be distinguished from the variation in power loss due to other circumstances.

For example, when a nonconductive foreign object is interposed between the electronic device and the external electronic device, power loss may rapidly increase in a first time period, and may decrease to be maintained slightly greater than the power loss before the first time period after the first time period. When a conductive foreign object is interposed, power loss may rapidly increase in the first time period, and may be maintained substantially greater than the power loss before the first time period after the first time period. Therefore, according to an embodiment, the electronic device may monitor the variation in power loss over time, thereby identifying whether a foreign object interposed between the electronic device and the external electronic device includes a conductive material.

According to an embodiment, in operation 540, the electronic device may use a criterion related to power loss in order to quantitatively determine whether the variation in power loss corresponds to a variation in power loss due to a conductive foreign object.

According to an embodiment, the criterion related to power loss may include whether the variance in power loss exceeds a third threshold value and/or whether power loss exceeds a fourth threshold at a specific time period.

According to an embodiment, when the variation in power loss satisfies the criterion related to power loss, the electronic device may determine that an event related to power loss occurs. According to an embodiment, when an event related to power loss occurs, the electronic device may determine that there is a conductive foreign object between the electronic device and the external electronic device.

According to an embodiment, even though the power loss does not exceed the first threshold in operation 540, when the variation in power loss exceeds the third threshold, the electronic device may determine that there is a conductive foreign object. The third threshold may vary depending on the type of an external electronic device.

According to an embodiment, the variation in power loss may be calculated from power received from the external electronic device. For example, the electronic device obtain a plurality of most recent power loss values from data corresponding to power received from by the external electronic device and may calculate the variation in power loss based on the plurality of power loss values.

For example, the variation in power loss may be calculated based on the difference between a second maximum value and a second minimum value among n power loss values (P_loss_1, P_loss_2, . . . , P_loss_n) which are most recently obtained at nth time point. A maximum value (max(P_loss_1, P_loss_2, . . . , P_loss_n)) and a minimum value (min(P_loss_1, P_loss_2, . . . , P_loss_n)) may not be considered to calculate the difference. When a new power loss (P_loss_n+1) is obtained at an n+1th time point, the variation in power loss may be calculated from a plurality of power loss values (P_loss_2, P_loss_2, . . . , P_loss_n+1), which includes the new power loss (P_loss_n+1) and excludes the oldest power loss value (P_loss_1). According to an embodiment, the method for calculating the variation in power loss is not limited to the above method and may vary.

According to an embodiment, even though the power loss does not exceed the first threshold in operation 540, when the power loss exceeds the fourth threshold, the electronic device may determine that there is a conductive foreign object. According to an embodiment, when a periodically obtained power loss value consecutively exceeds the fourth threshold, the electronic device may determine that there is a conductive foreign object.

For example, the electronic device may obtain a power loss value at the first time point, the second time point, . . . , and nth time point. When all the power loss values obtained at the first to nth time points exceed the fourth threshold, the electronic device may recognize that there is a conductive foreign object.

According to another embodiment, even though the power loss does not exceed the first threshold, when an increase in the power loss is detected at the first time point and then the power loss obtained at the second time point after the lapse of a certain time period exceeds the fourth threshold, the electronic device may determine that there is a conductive foreign object.

According to an embodiment, when the power loss continuously exceeds the fourth threshold at a third time point after the lapse of a second time period from the second time point, the electronic device may determine that there is a conductive foreign object.

According to an embodiment, when all of n power losses consecutively obtained since the second time point exceed the fourth threshold, the electronic device may determine that there is a conductive foreign object.

According to an embodiment, the electronic device may determine whether there is a conductive foreign object in consideration of both the variance in power loss and power loss in operation 540. Referring to FIG. 6, according to an embodiment, even though the power loss does not exceed the first threshold, the electronic device may determine whether the variance in power loss exceeds the third threshold in operation 540-1 and may determine whether subsequently obtained power loss exceeds the fourth threshold in operation 540-2. When both criteria are satisfied, the electronic device may determine that there is a conductive foreign object between the electronic device and the external electronic device.

For example, when power loss values that are obtained after a time point at which the variance in power loss exceeds the third threshold, continues to consecutively exceed the fourth threshold, the electronic device may determine that there is a conductive foreign object.

Although FIG. 6 shows that operation 540 includes both operation 540-1 and operation 540-2, operation 540 may include either operation 540-1 or operation 540-2 according to alternative embodiments.

According to an embodiment, in operation 540, when the power loss or the variance in power loss at the second time point after the lapse of the specified time period from the first time point, at which the increase in power loss is first detected, exceeds a specified threshold, the electronic device may determine that there is a conductive foreign object between the electronic device and the external electronic device.

According to another embodiment, when the power loss or the variance in power loss at and after the second time point after the lapse of the first time period from the first time point, at which the increase in power loss is first detected, continuously exceeds a specified threshold for a second time period, the electronic device may determine that there is a conductive foreign object between the electronic device and the external electronic device.

According to an embodiment, in operation 550, the electronic device may change the first threshold based on the result of operation 540 (not shown), thereby detecting a foreign object even when the power loss does not exceed the first threshold. The first threshold may be a reference value for determining that there is a foreign object between the electronic device and the external electronic device when the power loss exceeds the first threshold. Therefore, when the first threshold is changed to the second threshold, which is lower than the first threshold, the electronic device may determine that there is a foreign object between the electronic device and the external electronic device even though the power loss is lower than the first threshold.

According to an embodiment, when an event related to power loss is detected (540), the electronic device may change the first threshold to the second threshold, may determine that there is a conductive foreign object when a subsequently obtained power loss value exceeds the second threshold, and may stop power transmission in operation 560. According to another embodiment, when an event related to power loss is detected (540), the electronic device may determine that there is a conductive foreign object, may change the first threshold to the second threshold, and may stop power transmission when a subsequently obtained power loss value exceeds the second threshold.

FIG. 5 shows that when an event related to power loss is detected, it is determined whether to stop power transmission after operation 550, in which a determination is made for whether the power loss exceeds the second threshold. According to an embodiment, when an event related to power loss is detected in operation 540, it is possible to determine whether to stop power transmission without operation 550. Since detection of an event related to power loss means that existence of a conductive foreign object is recognized, operation 550 may be omitted.

According to an embodiment, when operation 550 is omitted, the electronic device may stop power transmission after the lapse of a specified time period from detection of the event related to power loss in operation 540. For example, when an event related to power loss, which may be the power loss exceeding the fourth threshold, is detected at the first time point, the electronic device may stop power transmission after the lapse of the specified time period from the first time point.

The first threshold may be a foreign object detection (FOD) threshold. According to an embodiment, even when the power loss does not exceed the FOD threshold, the electronic device may detect a conductive foreign object based on the subsequent variation in power loss, thus preventing a problem caused by the conductive foreign object. Accordingly, the FOD threshold of the electronic device may be set to be high for user convenience.

When the FOD threshold is set to be low, the electronic device can easily detect a foreign object, but may determine that there is a foreign object even by power loss due to a cover (e.g., a protection cover) coupled to the external electronic device or power loss caused by misalignment of the external electronic device on the power transmission device.

According to an embodiment, the FOD threshold may be set to be high so that power transmission is not stopped even though power loss occurs due to misalignment between the electronic device and the external electronic device or due to the cover, thereby contributing to user convenience. According to an embodiment, the electronic device may detect a conductive foreign object and may stop power transmission by changing an initially set FOD threshold to a lower threshold (e.g., the second threshold) during power transmission. According to an embodiment, even though a high FOD threshold is set, the electronic device can detect a conductive foreign object, thus improving user convenience and securing safety during wireless charging.

Figure 7:
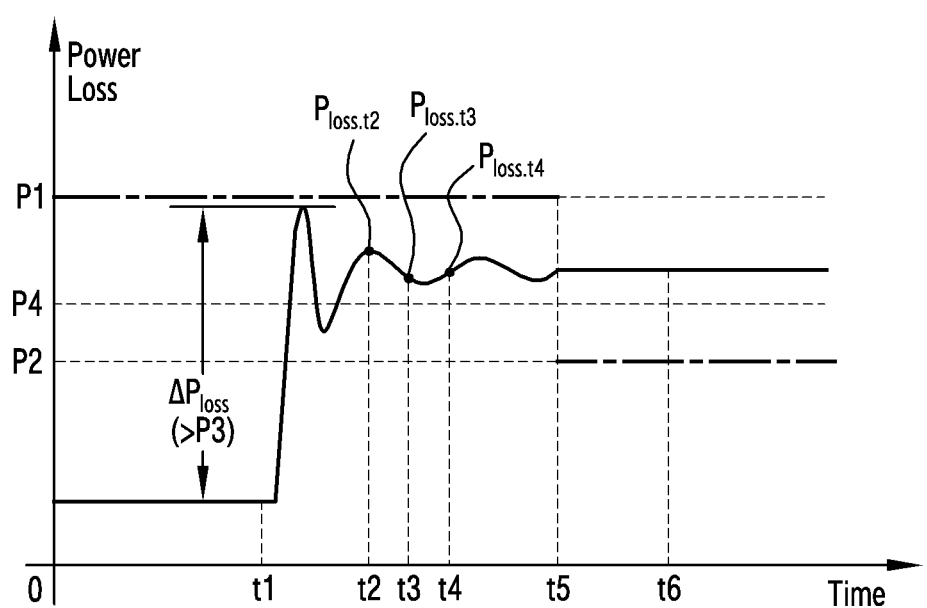
FIG. 7 is a graph illustrating power loss that occurs when there is a foreign object over time while an electronic device is transmitting power to an external electronic device according to an embodiment.

FIG. 7 is a graph illustrating power loss (solid line) that occurs when there is a foreign object including a conductive material and a threshold (dotted line) for detecting a foreign object over time while an electronic device (e.g., the electronic device 302 of FIG. 3) is transmitting power to an external electronic device (e.g., the external electronic device 301 of FIG. 3) according to an embodiment.

Referring to FIG. 7, power loss increases when a conductive foreign object is interposed between the electronic device and the external electronic device while the electronic device is transmitting power to the external electronic device.

Even though the conductive foreign object is interposed between the electronic device and the external electronic device at a first time point t1, power loss values obtained after the first time point t1 may not exceed a first threshold P1. Since the power loss does not exceed the first threshold P1, the electronic device may determine that there is no foreign object and may continue to transmit power to the external electronic device. When the electronic device does not stop transmitting power, the conductive foreign object may increase in temperature and may thus damage the electronic device and the external electronic device.

According to an embodiment, the electronic device may determine that there is a conductive foreign object according to a variation in power loss even though the power loss does not exceed the first threshold P1. The electronic device may change the first threshold P1 to a second threshold P2, which is lower than the first threshold value P1, at a fifth time point t5 to examine the variation in power loss between the first time point P1 and the fifth time point t5. The electronic device may stop power transmission when the power loss exceeds the second threshold value P2 at a sixth time point t6, thus protecting the electronic device and the external electronic device. According to an embodiment, the electronic device may determine that there is a conductive foreign object according to the variation in power loss between the first time point t1 and the fifth time point t5 and may stop power transmission, in which a process of changing the threshold may be omitted.

According to an embodiment, the electronic device may monitor the variation in power loss between the first time point t1 and the fifth time point t5, thereby identifying whether there is a conductive foreign object. Referring to FIG. 7, the power loss may increase after the conductive foreign object is interposed between the electronic device and the external electronic device at the first time point t1. The electronic device may determine whether power losses obtained at a second time point t2, a third time point t3, and a fourth time point t4 exceed a fourth threshold P4 in response to detecting a variance in power loss (ΔPloss) after the first time point t1 exceeding a third threshold P3. According to an embodiment, time intervals between the second time point t2 to the fourth time point t4 may correspond to the period in which the electronic device obtains the power loss information. That is, when all power losses (Ploss.t2, Ploss.t3, and Ploss.t4) consecutively obtained after the variance in power loss (ΔPloss) exceeds the third threshold P3 exceed the fourth threshold P4, the electronic device may change the first threshold P1 to the second threshold P2.

According to an embodiment, when the power loss exceeds an FOD threshold (e.g., the first threshold), the electronic device may determine that there is a foreign object and may stop transmitting power to the external electronic device. When the power loss occurs but does not exceed the FOD threshold, the electronic device does not generally stop power transmission.

Even though the power loss does not exceed the FOD threshold, when the power loss is due to a conductive foreign object, the electronic device needs to stop power transmission. When the conductive foreign object is continuously exposed to a magnetic field, a current may be induced in the conductive foreign object and the conductive foreign object may be heated to a high temperature due to the induced current.

According to an embodiment, even when the power loss does not exceed the FOD threshold, the electronic device may change the FOD threshold to a lower threshold based on a variation in power loss, thereby detecting a conductive foreign object.

TABLE 1

| Wireless charging capacity of electronic device | FOD threshold (First threshold) | Moving Average FOD (MFOD) Ploss.th (Third threshold) | Absolute Ploss (Fourth threshold) | Modified FOD threshold (Second threshold) |
|---|---|---|---|---|
| 5 W | 2000 mW | 800 mW | 800 mW | 500 mW |
| 6.5 W, 7.5 W, 12 W | 3300 mW | 1000 mW | 1300 mW | 1300 mW |
| 15 W, 18 W | 3500 mW | 1000 mW | 1500 mW | 1500 mW |

Table 1 shows actual examples of thresholds for detecting a foreign object per wireless charging capacity of the electronic device according to an embodiment.

According to an embodiment, when the electronic device is a 5 W wireless power transmission device, an initially set FOD threshold (first threshold) may be 2000 mW. When the variance in power loss (ΔPloss) exceeds 800 mW (MFOD Ploss.th (third threshold)) and all consecutive power losses subsequently obtained exceed 800 mW (absolute Ploss (fourth threshold)), the electronic device may change the FOD threshold to 500 mW (modified FOD threshold (second threshold)).

According to an embodiment, when the electronic device is a 6.5 W, 7.5 W, or 12 W wireless power transmission device, an initially set FOD threshold (first threshold) may be 3300 mW. When a variance in power loss (ΔPloss) exceeds 1000 mW (MFOD Ploss.th (third threshold)) and all consecutive power losses subsequently obtained exceed 1300 mW (absolute Ploss (fourth threshold)), the electronic device may change the FOD threshold to 1300 mW (modified FOD threshold (second threshold)).

According to an embodiment, when the electronic device is a 15 W or 18 W wireless power transmission device, an initially set FOD threshold (first threshold) may be 3500 mW. When a variance in power loss (ΔPloss) exceeds 1000 mW (MFOD Ploss.th (third threshold)) and all consecutive power losses subsequently obtained exceed 1500 mW (absolute Ploss (fourth threshold)), the electronic device may change the FOD threshold to 1500 mW (modified FOD threshold (second threshold)).

As described above, an electronic device according to an embodiment may include: a housing; a wireless charging coil configured to be disposed in the housing; a power transmission circuit configured to be electrically connected to the wireless charging coil; a wireless communication circuit configured to communicate with an external electronic device; and a control circuit configured to be electrically connected to a power management circuit and the wireless communication circuit, wherein the control circuit may be configured to: transmit power to an external electronic device; obtain data corresponding to power received by the external electronic device in response to the transmitted power using the wireless communication circuit; obtain power loss based on the obtained data; stop transmitting the power to the external electronic device when the power loss exceeds a first threshold; detect an event related the power loss at a first time point when the power loss is lower than the first threshold; determine whether the power loss obtained at a second time point after a lapse of a first time period from the first time point, at which the event is detected, exceeds a second threshold lower than the first threshold; and stop transmitting the power to the external electronic device when the power loss obtained at the second time point exceeds the second threshold.

According to an embodiment, in the electronic device, the control circuit may be configured to obtain a variance in power loss based on the power loss, and the event may include a case where the variance in power loss exceeds a third threshold.

According to an embodiment, in the electronic device, the variance in power loss may correspond to a difference between a second maximum value and a second minimum value among a plurality of power loss values.

According to an embodiment, in the electronic device, the event may include a case where the power loss, obtained after the variance in power loss exceeds the third threshold exceeds a fourth threshold.

According to an embodiment, in the electronic device, the event may include a case where a plurality of power loss values, obtained after the variance in power loss exceeds the third threshold consecutively exceeds a fourth threshold.

According to an embodiment, in the electronic device, the event may include a case where the power loss exceeds a fourth threshold.

According to an embodiment, in the electronic device, the event may include a case where a plurality of power loss values consecutively exceeds a fourth threshold.

According to an embodiment, in the electronic device, the control circuit may be configured to detect whether the power loss increases, and the event may include a case where the power loss obtained after a lapse of a specified time period from a time point at which an increase in the power loss is detected exceeds a fourth threshold.

According to an embodiment, in the electronic device, the control circuit may be configured to detect whether the power loss increases, and the event may include a case where a plurality of power loss values obtained after a lapse of a specified time period from a time point at which an increase in the power loss is detected consecutively exceeds a fourth threshold.

According to an embodiment, in the electronic device, the control circuit may be configured to transmit a signal corresponding to suspension of power transmission to the external electronic device when power transmission is stopped.

An electronic device according to an embodiment may include: a housing; a wireless charging coil configured to be disposed in the housing; a power transmission circuit configured to be electrically connected to the wireless charging coil; a wireless communication circuit configured to communicate with an external electronic device; and a control circuit configured to be electrically connected to a power management circuit and the wireless communication circuit, wherein the control circuit may be configured to: transmit power to an external electronic device; obtain data corresponding to power received by the external electronic device by the power using the wireless communication circuit; obtain power loss based on the obtained data; determine whether the power loss or a variance in power loss obtained based on the power loss exceeds a first threshold at a first time point; determine whether the power loss or the variance in power loss exceeds a second threshold at a second time point after a lapse of a first time period from the first time point; and stop transmitting the power to the external electronic device when the power loss obtained at the second time point exceeds the second threshold.

According to an embodiment, in the electronic device, the control circuit may be further configured to determine whether the power loss exceeds a third threshold at a third time point between the first time point and the second time point, and to stop transmitting power to the external electronic device in response to the power loss exceeding the third threshold at the third time point.

According to an embodiment, in the electronic device, the control circuit may be further configured to determine whether the variance in power loss exceeds a third threshold at a third time point between the first time point and the second time point, and to stop transmitting power to the external electronic device in response to the variance in power loss exceeding the third threshold at the third time point.

According to an embodiment, in the electronic device, the control circuit may be configured to transmit a signal corresponding to suspension of power transmission to the external electronic device when power transmission is stopped.

A power control method of an electronic device configured to transmit power to an external electronic device according to an embodiment may include: transmitting the power to the external electronic device; obtaining data corresponding to power received by the external electronic device in response to the transmitted power using a wireless communication circuit provided in the electronic device; obtaining power loss based on the obtained data; stopping transmitting the power to the external electronic device when the power loss exceeds a first threshold; detecting an event related the power loss at a first time point when the power loss is lower than the first threshold; determining whether the power loss obtained at a second time point after a lapse of a first time period from the first time point, at which the event is detected, exceeds a second threshold lower than the first threshold; and stopping transmitting the power to the external electronic device when the power loss obtained at the second time point exceeds the second threshold.

According to an embodiment, the method may further include obtaining a variance in power loss based on the power loss, wherein the event may include a case where the variance in power loss exceeds a third threshold.

According to an embodiment, in the method, the event may include a case where the power loss obtained after the variance in power loss exceeds a third threshold exceeds a fourth threshold.

According to an embodiment, in the method, the event may include a case where the power loss exceeds a fourth threshold.

According to an embodiment, the method may further include detecting whether the power loss increases, wherein the event may include a case where the power loss obtained after a lapse of a specified time period from a time point at which an increase in the power loss is detected exceeds a fourth threshold.

According to an embodiment, the method may further include transmitting a signal corresponding to suspension of power transmission to the external electronic device when power transmission is stopped.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The various example embodiments disclosed herein and illustrated in the drawings are provided by way of illustration and are not intended to limit the scope of the present disclosure. Therefore, all changes or modifications derived from the technical idea of the present disclosure as well as the embodiments described herein should be understood to fall within the scope of the present disclosure.

What is claimed is:

1. An electronic device comprising:
a housing;
a wireless charging coil disposed in the housing;
a power transmission circuit electrically connected to the wireless charging coil; and
a control circuit electrically connected to the power transmission circuit,
wherein the control circuit is configured to:
transmit power to an external electronic device using the wireless charging coil through the power transmission circuit;
obtain data corresponding to power received by the external electronic device in response to the power transmitted through the power transmission circuit;
obtain power loss based on the obtained data;
stop transmitting the power to the external electronic device when the power loss exceeds a reference threshold corresponding to a first threshold;
while the reference threshold corresponding to the first threshold, detect an event to determine a first time point when the power loss is lower than the first threshold based on the power loss which is equal to or less than the first threshold;
in case that the event is detected:
change the reference threshold from the first threshold to a second threshold lower than the first threshold;
in response to change in the reference threshold, determine whether the power loss obtained at a second time point after a lapse of a first time period from the first time point, exceeds the second threshold; and
stop transmitting the power to the external electronic device when the power loss obtained at the second time point exceeds the second threshold.

2. The electronic device of claim 1, wherein the control circuit is further configured to obtain a variance in power loss based on the power loss, and
the event is a case where the variance in power loss exceeds a third threshold.

3. The electronic device of claim 2, wherein the variance in power loss corresponds to a difference between a second maximum value and a second minimum value among a plurality of power loss values.

4. The electronic device of claim 2, wherein the event is a case where the power loss, obtained after a time point at which the variance in power loss exceeds the third threshold, exceeds a fourth threshold.

5. The electronic device of claim 2, wherein the event is a case where a plurality of power loss values, obtained after a time point at which the variance in power loss exceeds the third threshold, consecutively exceeds a fourth threshold.

6. The electronic device of claim 1, wherein the event is a case where the power loss exceeds a fourth threshold.

7. The electronic device of claim 1, wherein the event is a case where a plurality of power loss values consecutively exceeds a fourth threshold.

8. The electronic device of claim 1, wherein the control circuit is further configured to detect whether the power loss increases, and
the event is a case where the power loss, obtained after a lapse of a specified time period from a time point at which an increase in the power loss is detected, exceeds a fourth threshold.

9. The electronic device of claim 1, wherein the control circuit is further configured to detect whether the power loss increases, and
the event is a case where a plurality of power loss values, obtained after a lapse of a specified time period from a time point at which an increase in the power loss is detected, consecutively exceeds a fourth threshold.

10. The electronic device of claim 1, wherein the control circuit is further configured to transmit a signal corresponding to suspension of power transmission to the external electronic device when power transmission is stopped.

11. An electronic device comprising:
a housing;
a wireless charging coil disposed in the housing;
a power transmission circuit electrically connected to the wireless charging coil; and
a control circuit electrically connected to the power transmission circuit,
wherein the control circuit is configured to:
transmit power to an external electronic device using the wireless charging coil through the power transmission circuit;
obtain data corresponding to power received by the external electronic device through the power transmission circuit;
obtain power loss based on the obtained data;
determine whether a variance in power loss obtained based on the power loss exceeds a reference threshold corresponding to a first threshold at a first time point;
change the reference threshold from the first threshold to a second threshold lower than the first threshold;
in response to change in the reference threshold, determine whether the power loss or the variance in power loss exceeds the second threshold at a second time point after a lapse of a first time period from the first time point; and
stop transmitting the power to the external electronic device when the power loss or the variance in the power loss obtained at the second time point exceeds the second threshold.

12. The electronic device of claim 11, wherein the control circuit is further configured to determine whether the power loss exceeds a third threshold at a third time point between the first time point and the second time point, and to stop transmitting power to the external electronic device in response to the power loss exceeding the third threshold at the third time point.

13. The electronic device of claim 11, wherein the control circuit is further configured to determine whether the variance in power loss exceeds a third threshold at a third time point between the first time point and the second time point, and to stop transmitting power to the external electronic device in response to the variance in power loss exceeding the third threshold at the third time point.

14. The electronic device of claim 11, wherein the control circuit is configured to transmit a signal corresponding to suspension of power transmission to the external electronic device when power transmission is stopped.

15. A power control method of an electronic device configured to transmit power to an external electronic device, the method comprising:
    transmitting the power to the external electronic device;
    obtaining data corresponding to power received by the external electronic device in response to the transmitted power using a wireless communication circuit provided in the electronic device;
    obtaining power loss based on the obtained data;
    stopping transmitting the power to the external electronic device when the power loss exceeds a reference threshold corresponding to a first threshold;
    while the reference threshold corresponds to the first threshold, detecting an event to determine a first time point when the power loss is lower than the first threshold based on the power loss which is equal to or less than the first threshold;
    in case that the event is detected, changing the reference threshold from the first threshold to a second threshold lower than the first threshold;
    in response to change in the reference threshold, determining whether the power loss obtained at a second time point after a lapse of a first time period from the first time point, exceeds the second threshold; and
    stopping transmitting the power to the external electronic device when the power loss obtained at the second time point exceeds the second threshold.

16. The method of claim 15, further comprising:
    obtaining a variance in power loss based on the power loss,
    wherein the event is a case where the variance in power loss exceeds a third threshold.

17. The method of claim 16, wherein the event is a case where the power loss, obtained after a time point at which the variance in power loss exceeds a third threshold, exceeds a fourth threshold.

18. The method of claim 15, wherein the event is a case where the power loss exceeds a fourth threshold.

19. The method of claim 15, further comprising:
    detecting whether the power loss increases,
    wherein the event is a case where the power loss, obtained after a lapse of a specified time period from a time point at which an increase in the power loss is detected, exceeds a fourth threshold.

20. The method of claim 15, further comprising:
    transmitting a signal corresponding to suspension of power transmission to the external electronic device when power transmission is stopped.

\* \* \* \* \*